Dec. 17, 1957 W. S. STOKES 2,816,575
APPARATUS FOR LAYING A PIPE LINE UNDER A RIGHT-OF-WAY
Filed May 11, 1953 2 Sheets-Sheet 1
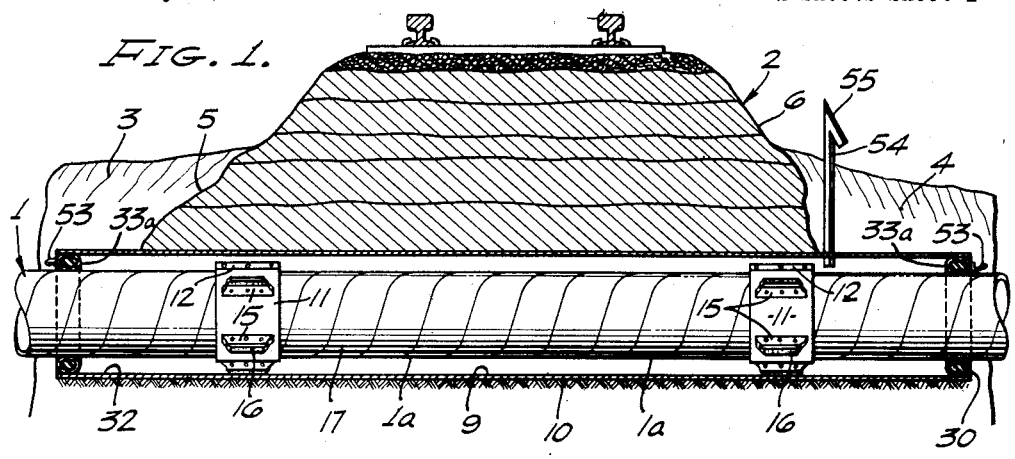
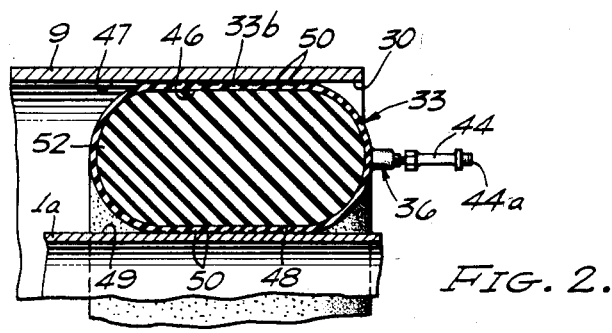
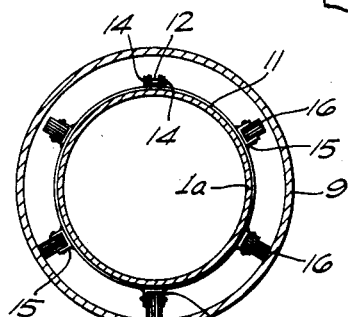
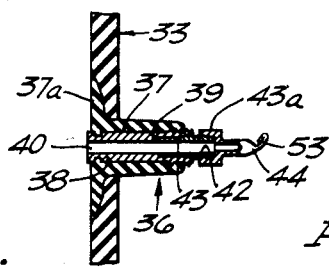
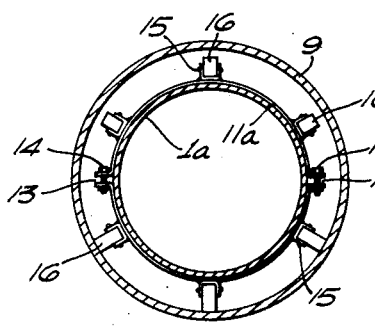
WILLIAM S. STOKES
INVENTOR.
BY
ATTORNEY

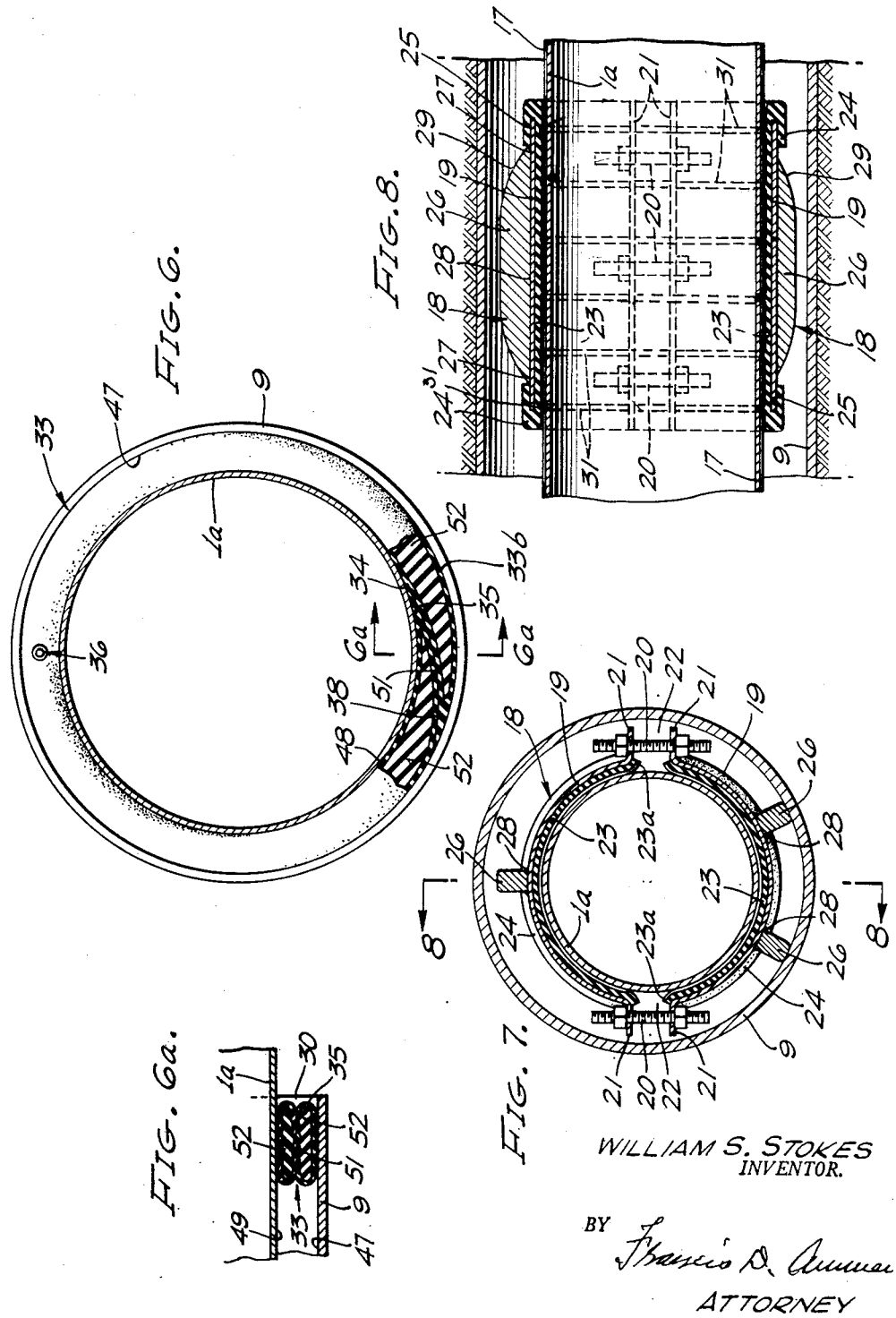

United States Patent Office 2,816,575
Patented Dec. 17, 1957

2,816,575

APPARATUS FOR LAYING A PIPE LINE UNDER A RIGHT-OF-WAY

William S. Stokes, Tarzana, Calif.

Application May 11, 1953, Serial No. 354,264

7 Claims. (Cl. 138—48)

This invention relates to a method and apparatus for facilitating the laying a pipe line passing under railways, highways, streets, rights of way, or the like, and while the invention is applicable, and probably has its greatest utility when employed for placing gas or oil lines under railways, highways, and other rights of way, it can of course, be employed in any situation in connection with pipe lines for conducting any kind of fluid or liquid or gas through a space where the line is not readily accessible from above.

It is a well known fact that pipe lines laid under ground are subject to considerable destructive action due to electrolysis. Such action is probably aggravated by the presence of steel rails, especially when the rails are for a trolley line employing a ground return for its operating current. One of the objects of this invention is to provide apparatus and a method for assembling the parts thereof, which will effectively and substantially eliminate electrolytic action upon the pipe line in the locality of the intersection.

Another object of the invention is to provide a method and apparatus for the purpose indicated above which can readily be applied economically, and which will operate effectively throughout a considerable period of years.

As a preventive to electrolysis effects, it has been the practice in some localities to maintain in the carrier line a certain electric potential, but such a potential must be maintained within certain limits or electrolytic corrosion effects will still occur. So that method is not a satisfactory solution for the problem.

One of my objects is to provide a construction where the line passes under a right-of-way that will prevent electrolytic effects regardless of whether the imposed potential method is employed, or not.

In accordance with this invention the carrier line for any fluid such as gas or oil at an intersection is encased in an outer tube or pipe of larger diameter; and if the annular areas at the ends of the encasing tube are not sealed off water carrying alkali or other harmful salts may enter the outer casing and produce a condiiton favoring direct corrosion or corrosion effects due to electrolytic action.

One of my objects is to provide a water tight seal for the casing pipe ends that will eliminate such corrosive effects.

In practicing the invention an outer tubing or casing is employed extending transversely under the right of way in which the carrier line operates, and one of the objects of the invention is to provide simple means for insulatingly supporting the pipe line within the outer tubing or casing, thereby preventing the occurrence of any electrolytic action in the portion of the pipe line that extends under or past the right of way. Such electrolytic action may result from contact of the carrier line with the casing or outer tubing.

Further objects of the invention will be evident from a careful reading of the following specification, and an examination of the drawing.

The invention consists of the novel method and in the novel combinations of parts to be described hereinafter, all of which contribute to produce an efficient method and apparatus for laying an electrolytic proof carrier line (pipe lines) under a railway right-of-way, of public highway.

A preferred embodiment of the invention is described in the following specification, while the broad scope of the invention is pointed out in the appended claims.

In the drawing:

Figure 1 represents a vertical cross-section taken through a right of way which by way of example is illustrated as being located at a point where the right of way includes an embankment. In this view the aprons of the embankment and the ends of the portion of the pipe line illustrated are broken away.

Figure 2 is a vertical section taken about in the same plane as Figure 1 upon a larger scale, and illustrating details of certain apparatus that I prefer to use in practicing my method, and which effectively seals off the ends of the outer tubing in which the pipe line is supported.

Figure 3 is a longitudinal section upon a large scale taken through an inlet nipple such as I prefer to employ in the sealing rings that I use to form annular sealing zones at the ends of the outer tubing, and surrounding the pipe line. This view also shows the way in which I prefer to seal off the inflating tube or duct through which the sealing material is introduced to the sealing rings.

Figure 4 is a vertical cross-section through the pipe line and the outer tubing and illustrating more in detail an embodiment of insulating means that I may employ for supporting and insulating the pipe line within the outer tubing.

Figure 5 is a view similar to Figure 4 but illustrating a modified type of the split ring, or band, shown in Figure 4 which carries the insulation members for supporting the pipe line and substantially centering the same within the outer tubing.

Figure 6 is a cross-section through the inside carrier pipe showing one of the inflated sealing tubes in place between the carrier tube and the casing, and with a portion of the overlap of the ends of this sealing tube broken away and shown in section.

Figure 6a is a longitudinal section in a radial plane on line 6a—6a of Figure 6, and further illustrating the ribbed character of the contacting faces of the sealing tube at the overlap.

Figure 7 is a cross-section illustrating a different type of insulation from that shown in Figure 1, in which the contact points on the split band, that rest on the outer casing may be of conductive metal, and in which the entire ring or band is perfectly insulated by reason of insulation carried by the ring itself, that is located between the band and the carrier tubing.

Figure 8 is a longitudinal section taken about on the line 8—8 of Figure 7 and further illustrating details of the construction of this centering band and its insulation. This type of insulation shown in Figure 7 and 8 is also of my invention.

Suppose, for example, that it is proposed to run a pipe line under a railway right-of-way such as illustrated in Figure 1. In such a case the ditch for the pipe line 1 is made so that it heads up at each side of the embankment 2, and in the present instance the outline of the embankment at the heads of these ditches 3 and 4 may have a profile such as indicated by the lines 5 and 6. The character of these lines 5 and 6 depends upon what position they should have to give access to the ends of an outer metallic tubing 9 that I employ as an envelope for the pipe 1.

In accordance with my invention after setting the casing pipe 9 in position I run into it the section 1a of bare metallic carrier line 1. Such a section of tubing is often of considerable diameter and weight so that it is not feasible to support the pipe section from its rear end and keep it out of contact with the surface of the casing tubing; but such contact between the tubing should be avoided to prevent any possibility of the sheathing on the inner pipe from becoming torn or otherwise injured. So, I prefer to provide a plurality of outwardly projecting spacers on the carrier pipe. In the drawings two or more of such spacers are shown on the under side of the carrier pipe section, constructed so as to support the weight of the pipe-section and enable it to be skidded into place on the inner surface of the casing tubing. One or more other spacers are employed on the upper side of the carrier pipe, and all of these spacers co-operate to prevent injury to the sheathing, and function also to center the inner tubing inside the casing tubing when the inner tubing has been moved into its final position.

In the present instance, for convenience, the axes of the tubing are represented as horizontal but it is obvious that in practice the pipe line may be passed through tubing that is laid on any necessary grade.

In accordance with my invention I provide the pipe line portion 1a, before passing it into the tubing 9 with means centering and insulatingly supporting the piping 1a. Such means is preferably in the form of rings 11 preferably split rings, such as illustrated in Figure 4, having a single split point 12. But if desired, these rings in heavier piping may be of the type shown in Figure 5, which shows a ring 11a provided with two split points 13.

At the split points the usual ears are provided for the attachment of clamping bolts 14.

These rings 11 have U-shaped brackets 15 welded to them, and present sockets on their outer sides which carry insulating blocks 16 which may be of Micarta or other suitable insulation. These blocks project radially a considerable distance, and are in sufficient number to center the pipe portion 1a and to effectively insulate it from any metallic contact with the outer tubing 9.

Pipe lines for carrying oil or gas are usually wrapped with sheathing 17 applied over a hot bituminous coating as a protective covering and usually this sheathing is of tough asbestos type paper impregnated with a composition of an asphaltum or coal tar nature.

The insulating blocks 16 must be of tough material capable of supporting the weight of the carrier pipe section 1a when it is being shoved into place. For this reason these blocks may be of laminated form with the panes of lamination extending substantially radially from the axis of the tubing 1a. Micarta serves this purpose well.

However, for the two insulating rings I may employ two insulating members in the form of two half-rings 18 having characteristics illustrated in Figures 7 and 8.

In Figures 7 and 8 I illustrate another embodiment of the means for insulatingly supporting and assisting the skidding of the carrier pipe section into place.

In that case I provide two insulating members 18. Each of these insulating members 18 is preferably composed of two semi-circular ring sections 19 that come together to form a split ring similar to the rings 11 and 11a, and similarly provided with clamping up bolts 20 applied to outwardly projecting flanges 21 at the gaps 22 between the ring sections. Each ring section 19 has a liner 23 of insulating material, said liner being in the form of a semi-cylindrical molded insulating material such as rubber provided at each end with a flange 24 spaced outwardly from the body of the liner so that two semi-cylindrical sockets 25 are formed, one at each end of the insulating member 18, to receive the tips of the ring-sections 19. In the vicinity of the split points 22 the longitudinal edges 23a of the liners 23 are extended somewhat into the gaps so as to prevent any possibility of the metal flanges 21 approaching too near each other if the clamping rings are unduly tightened up at the bolts 20.

On the outer side of each ring section 19 a plurality of skidding blocks or fins 26 are provided, and these are preferably separate pieces of suitable metal that are spot welded to the outer sides of the ring-sections by welds that may be located at the end points 27, and preferably also at an intermediate point 28 near the middle of each ring-section. These skid blocks or fins 26 are preferably of elongated form and have tapered ends or tips 29 the outer faces of which converge or incline inwardly toward the flanges 24.

The tapered tips 29 facilitate handling the skids 26 into the mouth or open end 30 of the casing pipe 8. In Figure 1 the open mouth 30 is located at the right of the casing tube, on the assumption that the piping is being run in from the right end of the casing tube.

This type of insulating ring, of course, gives a metal to metal contact from the skid blocks to the outer casing, but the half-sections of the metal rings are very thoroughly insulated from the carrier pipe sections 1a by the liner 23 that is composed of rubber or a suitable plastic. The liners are preferably plastic to facilitate their application to the ring-sections.

In order to increase the holding grip of the ring-sections 19 on the outside of the carrier tubing 1a I prefer to form the inner face of each insulating half sleeve or liner 23 with a plurality of circumferentially extending ribs 31. These ribs are preferably quite narrow so that when the sleeves are tightened up their pressure is highly concentrated against the carrier pipe surface, to prevent their slipping.

Instead of molding the liner sleeve 23 of rubber, I may mold it of thermo-plastic; or I may mold the entire piece, metal and liner, of a tough thermo-plastic known commercially as stabilized polyvinyl chloride thermoplastic which is a tough material with relatively high tensile and compressive strength.

After the carrier-tube section 1a has been run into the outer casing-tube 9 I seal up the mouth 30, and the mouth 32 at the other end, by means of an inflatable annulus 33, preferably of rubber filled with insulating material. This annulus may be in the form of a continuous annulus 33a of uniform cross-section (see Figure 1); that kind of annulus is to be used when a contract for the installation requires a considerable number of them of substantially the same diameter. However, in order to adapt such a sealing annulus for use through a considerable range in diameters, I prefer to employ an annulus 33 having the structure illustrated in Figures 6 and 6a. In these figures the annulus 33 is also made of rubber or similar material, but is not of uniform cross-section, and is formed with a "split" joint or overlap at the point 34, and at this point the annulus is provided with elongated tapered tip portions or tips 35 which overlap each other, for example, as indicated in Figure 6. On the intermediate portion, preferably adjacent its middle point, an inflating nipple 36 is provided, which may be constructed somewhat as illustrated in Figure 3, that is to say, it includes a tubular mushroom-formed body 37 the head 37a of which is on the inner side of the wall of the annulus 33, and this body 37 carries a tubular core 38 presenting an inflating duct 40 with a conical seat 39, the outer end of the core 38 being provided with internal thread 42 for attachment of an adapter nipple 43. The inner end of this nipple seats upon the seat 39; and this nipple 43 has external thread 43a at its tip to receive an inflater tube 44 of soft metal such as copper, having a "hex" head that screws onto the thread 43a at the end of the nipple 43. An inflating hose, not illustrated, is attached on the thread 44a at the outer end of the inflater tube 44.

In practice of my invention I inflate either annulus by means of an emulsion, or water dispersed asphaltum grouting or some similar suitable material which may or may not include a bituminous. This filler substance 52 is forced into the annulus 33 under sufficient pressure to cause it to develop considerable pressure of the outer wall portion 33b of the annulus against the inner face 47 of the outer tube 9, and also develops pressure between the inner and outer annular wall portion 48 of the annulus and the outer face 49 of the carrier-tubing. (See Figure 2.) And the faces of these wall portions 53b and 48 are preferably formed with a wavy or ribbed cross-section such as illustrated in Figure 2, so that these faces include a series of circumferential beads 50.

If the annulus has a continuous wall such as illustrated in Figure 1 these ribs 50, of course, pass continously around the inner and outer peripheries of the annulus. In either case, before applying the annulus in a deflated state, in the annular space surrounding the end of the carrier tube-section 1a, the contacting surfaces at 33b and 48 of the annulus should be smeared with a sufficient quantity of adhesive having a rubber or similar base that will insure that a good sealing connection will be effected between the contacting surfaces; and also between the contacting surfaces at the overlap 51 (see Figure 6) where the adjacent inclined faces of the overlap at 34 is located.

After effecting a tight seal under pressure in accordance with my invention I disconnect the pressure developing means employed to inflate the annulus with the inflating medium 52, and immediately upon disconnecting the same I cut, and apply pliers to the end of the tube 44 to flatten it and then bend it up upon itself to form a tightly compressed bend 53.

In using the overlapping type of annulus 33 the overlap at 34 should be located at the under side, so that the inflating nipple 36 is at the upper side of the annulus in a position to insure that any air present in the annulus will escape while the liquid filler under pressure is flowing into the annulus. With the other type of annulus the inflating nipple should also be located above to permit escape of air from its interior (see Figure 2).

The liquid composition filler for the sealing rings, that I employ is preferably hot enough to vulcanize the inflating nipples 36 to the annuluses 33, and the walls of the annuluses to the surfaces of the carrier line and its casing.

Before putting this annulus or ring 33 in place in the deflated condition, I prefer to brush the surfaces of the carrier pipe and the inner surface of the casing end with a special catalytic vulcanizing liquid cement. I permit the cement to dry for approximately one minute, and then I immediately place the annulus in position and promptly inflate it with a rubber compound filler which causes the annular ribs to press forcibly against the cement coated contacting surfaces. By using a hot filler the effect obtained is substantially the equivalent of vulcanizing. There should be a considerable number of the beads 50 as each one of them operates as an individual sealing ring or zone to seal off the annular space between the carrier line and its casing. Also, the beads help to keep the liquid cement in place by preventing it from running off laterally.

Instead of employing rubber for the annulus 33 or 33a, I may employ a stabilized polyvinyl chloride thermoplastic in the composition of their walls. This material is not affected by contact with petroleum oils and an annulus of this material will withstand an internal pressure of as much as 300 lbs. per square inch developed when inflating an annulus with the grout.

However, a pressure of 5 lbs. per square inch is sufficient in ordinary practice.

The deterioration of the thermo-plastic material is substantially nil, and it is far superior to rubber in this respect.

The law in some states requires the annular space between the carrier line and the casing tubing to be vented. In such case I provide an upwardly extending vent pipe such as indicated at 54 in Figure 1, the upper end of which is preferably with a weather head 55 that operates as a trap to exclude rain.

Many other embodiments of this invention may be resorted to without departing from the spirit of the invention.

I claim and desire to secure by Letters Patent:

1. A pipe line construction to prevent electrolytic action in the same, passing under a railway right-of-way, or the like, comprising an outer, metallic casing tubing extending transversely under the right-of-way, carrier pipe tubing of smaller diameter located within the same, conducting a fluid flowing continuously therethrough, insulating supports for resisting, and preventing passage of electric currents to or from said casing, attached to the carrier tubing at intermediate points within the casing tubing operating to insulate electrically, and support the carrier tubing substantially centered within the casing tubing, inflated annular sealing rings of oblong cross section, adjacent the ends of the casing tubing composed of insulating material, and filling the annular space between the two tubings with its inner and outer walls lying against the walls of the carrier tubing and the casing tubing respectively, and a sealing fluid under confined pressure within the said sealing rings, and maintaining the outer periphery of the same pressed forcibly against the inner face of the casing tubing and the inner periphery of the sealing rings pressed forcibly against the outer face of the carrier tubing.

2. A pipe line construction to prevent electrolytic action, according to claim 1, in which the inner and outer peripheries of said sealing rings have continuous annular ribs encircling the same for concentrating the sealing pressure at said ribs against the tubing surfaces.

3. A pipe line construction according to claim 1 including an adhesive substance applied between the contacting surfaces of the sealing rings and the said tubing.

4. In apparatus of the kind described, for electrically insulating supporting a carrier pipe line passing under a railway right-of-way, or the like, the combination of an outer metallic casing tubing, an inner metallic carrier tubing with the casing tubing, a pair of split rings secured on the carrier tubing spaced from each other and located at intermediate points within the casing tubing, said split rings having insulating blocks of laminated insulating material in which the planes of their lamination extend longitudinally with the axis of said carrier tube, and annular inflated rings with their inner and outer walls lying against the walls of the carrier tubing and the casing tubing respectively, said rings being of oblong cross section and of insulating material surrounding the carrier tubing and located respectively at the mouths of the outer tube, sealing off the annular space between the tubing at the ends of the outer tubing.

5. A pipe line construction to prevent electrolytic action in the same, lying under a railway-right-of-way, or the like, comprising an outer, metallic, casing tubing extending transversely under the right-of-way, carrier pipe tubing of smaller diameter, located within the casing tubing, and also of metallic material for conducting a fluid flowing continuously therethrough, insulating support for resisting and preventing passage of electric currents to, or from said casing, attached to the carrier tubing at intermediate points within the casing tubing, operating to insulate electrically and support the carrier tubing substantially centered within the casing tubing, inflated annular sealing rings of oblong cross-section adjacent the ends of the casing tubing composed of insulating material, and filling the annular space between the tubing, said sealing rings having their inner and outer walls with respect to the axis of the tubings lying against the walls of the carrier tubing and the casing tubing respectively, and a sealing fluid confined under pressure within the said sealing rings and maintaining the outer periphery of the rings pressed forcibly against the inner face of the casing tubing and pressing the inner periphery of the sealing rings forcibly against the outer face of the carrier tubing, the inner and outer peripheries of said sealing rings having continuous annular ribs encircling the same for concentrating the sealing pressure at said ribs against the tubing surfaces.

6. A pipe line construction for passing a carrier pipe line under a railway-right-of-way, or the like, comprising an outer metallic casing tubing extending transversely under the right-of-way, metallic carrier pipe tubing of smaller diameter located within the casing tubing for conducting a fluid flowing continuously therethrough, inflated sealing rings of oblong cross-section composed of insulating material disposed adjacent the ends of the carrier tubing filling the space between the said tubings, and a grouting of insulating material filling the chambers within the said sealing rings under pressure and confined therein, pressing the outer peripheries of the said sealing rings, with respect to the axis of the casing tubing, against the inner surface of the casing tubing, and pressing their inner peripheries against the outer surface of the carrier tubing, said rings being of insulating material and operating to insulate the carrier tubing from the casing tubing, said construction including a rigid metallic split ring secured to the carrier pipe tubing adjacent one end of said casing tubing, another metallic split ring secured to the carrier tubing adjacent the other end of said casing tubing, said split rings having outwardly projecting U-shaped brackets welded thereto, rigid blocks of electrical insulating material secured in the said U-shaped brackets and projecting outwardly from the same, some of said rigid blocks located on the under side of the carrier tubing so as to be able of functioning as skids when a section of said carrier tubing is shoved into place through one end of said casing tubing, said rigid rings and blocks operating to center, and to insulate, the said carrier tubing electrically from the said casing tubing.

7. Apparatus of the kind described for electrically insulating and supporting a carrier pipe line passing under a railway right-of-way or the like, comprising an outer metallic casing tubing extending transversely under the right-of-way, metallic carrier pipe tubing of smaller diameter than the casing located within the same, inflated sealing rings of oblong cross-section having flexible walls, disposed adjacent the ends of the carrier tubing, filling the space between the said tubings; each of said rings having a chamber enveloped by the flexible wall of the ring, a filler composed of water-dispersed asphaltum composition completely filling the chambers within said tubes and under pressure, a rigid metallic split-ring secured to the carrier pipe tubing adjacent each end of said casing tubing, substantially U-shaped brackets secured to the split rings, outwardly projecting rigid blocks of insulating material carried by said brackets, some of said rigid blocks being located on the under side of the carrier tubing and capable of functioning as skids sliding on the casing tubing when a section of said carrier tubing is shoved into place through one end of said casing tubing, said rigid rings and blocks operating to center and insulate the said carrier tubing electrically from the casing tubing.

References Cited in the file of this patent
UNITED STATES PATENTS

| | | |
|---|---|---|
| 1,466,592 | King | Aug. 28, 1923 |
| 1,834,434 | Starr | Dec. 1, 1931 |
| 1,852,225 | Westin | Apr. 5, 1932 |
| 1,991,455 | Gottwald | Feb. 19, 1935 |
| 2,027,961 | Currie | Jan. 14, 1936 |
| 2,309,658 | Miller | Feb. 2, 1943 |
| 2,399,544 | Donner | Apr. 30, 1946 |
| 2,504,462 | Sprague et al. | Apr. 18, 1950 |
| 2,504,478 | Whatley | Apr. 18, 1950 |
| 2,520,046 | Merrell | Aug. 22, 1950 |
| 2,551,867 | Bond | May 8, 1951 |